(12) United States Patent
Jain et al.

(10) Patent No.: US 10,812,586 B2
(45) Date of Patent: *Oct. 20, 2020

(54) METHOD AND SYSTEM FOR HIGH AVAILABILITY TOPOLOGY FOR MASTER-SLAVE DATA SYSTEMS WITH LOW WRITE TRAFFIC

(71) Applicant: Oath Inc., New York, NY (US)

(72) Inventors: Ankur Subhash Jain, Cupertino, CA (US); Ramkartik Mulukutla, Santa Clara, CA (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,930

(22) Filed: May 15, 2019

(65) Prior Publication Data
US 2019/0268180 A1    Aug. 29, 2019

Related U.S. Application Data

(63) Continuation of application No. 15/601,403, filed on May 22, 2017, now Pat. No. 10,341,434.

(51) Int. Cl.
*G06F 15/173* (2006.01)
*H04L 29/08* (2006.01)
(Continued)

(52) U.S. Cl.
CPC .......... *H04L 67/1095* (2013.01); *G06F 3/065* (2013.01); *G06F 3/067* (2013.01);
(Continued)

(58) Field of Classification Search
CPC ............................ G06F 3/067; H04L 41/0668
(Continued)

(56) References Cited

U.S. PATENT DOCUMENTS 6,523,032 B1 * 2/2003 Sunkara ............ G06F 16/24532
9,032,017 B1 * 5/2015 Singh .................... G06F 16/182
709/203

(Continued)

OTHER PUBLICATIONS

Office Action dated Nov. 1, 2019 in U.S. Appl. No. 16/412,827.
Notive of Allowance dated Mar. 18, 2020 in U.S. Appl. No. 16/412,827.

*Primary Examiner* — Hee Soo Kim
(74) *Attorney, Agent, or Firm* — Pillsbury Winthrop Shaw Pittman LLP

(57) ABSTRACT

The present teaching relates to a system, method, medium for a data system, which comprises a plurality of data centers with one read/write master server designated to handle write and consistent read requests and a plurality of read master servers designated to handle normal read requests, wherein the master servers form a ring structure and each is connected to a corresponding slave server. When a data access request is received, a read master communication unit invokes one of the plurality of read master servers in the data system if the received data access request is a normal read request, a main master communication unit invokes the read/write master server if the received data access request is either a write request or a consistent read request. When a response is received from the invoked handling master server, a response processing unit responds to the data access request based on the received response.

21 Claims, 12 Drawing Sheets

(51) Int. Cl.
*G06F 13/364* (2006.01)
*G06F 3/06* (2006.01)
*G06F 11/18* (2006.01)
*H04L 12/423* (2006.01)
*H04L 12/403* (2006.01)
*G06F 11/20* (2006.01)
G06F 15/16 (2006.01)

(52) U.S. Cl.
CPC .......... *G06F 3/0613* (2013.01); *G06F 3/0619* (2013.01); *G06F 3/0635* (2013.01); *G06F 11/18* (2013.01); *G06F 11/2058* (2013.01); *G06F 11/2064* (2013.01); *G06F 11/2069* (2013.01); *G06F 11/2082* (2013.01); *G06F 13/364* (2013.01); *H04L 12/403* (2013.01); *H04L 12/423* (2013.01); *H04L 67/1097* (2013.01)

(58) Field of Classification Search
USPC .................................................. 709/208, 211
See application file for complete search history.

(56) References Cited

U.S. PATENT DOCUMENTS

| | | | |
|---|---|---|---|
| 9,317,576 B2 | 4/2016 | Merriman et al. | |
| 2011/0184920 A1* | 7/2011 | Vosshall | G06F 16/2365 707/690 |
| 2015/0363124 A1* | 12/2015 | Rath | G06F 11/2097 709/219 |
| 2016/0110438 A1 | 4/2016 | Rana et al. | |

* cited by examiner

METHOD AND SYSTEM FOR HIGH AVAILABILITY TOPOLOGY FOR MASTER-SLAVE DATA SYSTEMS WITH LOW WRITE TRAFFIC

CROSS-REFERENCE TO RELATED APPLICATIONS

The present application is a continuation of U.S. patent application Ser. No. 15/601,403 filed May 22, 2017, now U.S. Pat. No. 10,341,434, which is hereby incorporated by reference in its entirety.

BACKGROUND

1. Technical Field

The present teaching generally relates to computer systems. More specifically, the present teaching relates to data systems.

2. Technical Background

With the development of the computers, ever increasing amount of information is stored in computer data systems. The rapid growth of the Internet makes it possible for users to access data via network connections anytime and anywhere. To meet the demand, data centers have been designed to aim at providing data availability 24 hours a day and 7 days a week. To meet such a goal, data centers are constructed to provide fault tolerance so that when some computers in data center network fail, alternative computers in the network can be used to continue the service to data access requests.

FIG. 1 (PRIOR ART) shows an exemplary traditional configuration 100 of data centers that provide fault tolerance. In the exemplary system shown in FIG. 1, there are two data centers, data center 1 and data center 2. In data center 1, there are two master computers, master M11 110 and master M12 120, both being read and write servers. Master server M11 110 is connected to master M12 120 and data migrate in a single direction from master M11 110 to master 12 120. In data center 2, there are also two master computers, master M21 130 and master M22 140, both being read and write servers. Master server M21 130 is connected to master M22 140 and data migrate in a single direction from master M21 130 to master 22 140.

Data center 1 and data center 2 are also connected in the following manner. Data in data center 1 can be migrated to data center 2 via master M12 120. Specifically, M12 120 can move data in data center 1 to master M21 130 in data center 2. In the other direction, data in data center 2 can be migrated to data center 1 via master M22 140. Specifically, data in data center 2 may be migrated to data center 1 via master M22 140 to master M11 110 of data center 1. In this configuration, whenever there is an issue in one of the data centers, data stored therein may be migrated to the other so that subsequent data access requests can be handled by the data center that now has the data from the failing data center.

Although data access service can be continued in this configuration, because data migration has to cross data centers, it can be slow and inefficient. In addition, depending on the nature of applications, the efficiency may also differ. For instance, for some applications, most of the data access requests may involve read data and only a small number involves write. Examples of such application include content management systems, inventory management systems, booking systems, etc. In such applications, a typical user spends most time analyzing data and very small fraction of their time updating data. For such applications, it is important to be able to read whenever it is needed without or with little interruption.

Thus, an improved data system that can provide efficient and continued data access services is needed.

SUMMARY

The teachings disclosed herein relate to methods, systems, and programming for advertising. More particularly, the present teaching relates to methods, systems, and programming related to continuous data access.

In some embodiments, the present teaching discloses a data system, which comprises a plurality of data centers with one read/write master server designated to handle write and consistent read requests and a plurality of read master servers designated to handle normal read requests, wherein the master servers form a ring structure and each is connected to a corresponding slave server. When a data access request is received, a read master communication unit invokes one of the plurality of read master servers in the data system if the received data access request is a normal read request, a main master communication unit invokes the read/write master server if the received data access request is either a write request or a consistent read request. When a response is received from the invoked handling master server, a response processing unit responds to the data access request based on the received response.

In other embodiments, the present teaching discloses a method for a data system, which comprises a plurality of data centers with one read/write master server designated to handle write and consistent read requests and a plurality of read master servers designated to handle normal read requests, wherein the master servers in the data system form a ring structure and each is connected to a corresponding slave server. A data access request is received at the data system. If the received data access request is a normal read request, one of the plurality of read master servers is invoked to handle the data access request. If the received data access request is either a write request or a consistent read request, the read/write master server is invoked to handle. When a response is received from the invoked master server, the data system responds to the received data access request based on the received response.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, medium, and other implementations and applications thereof directed to fault tolerant data centers. The database architecture or topology often plays a key role in ensuring high availability of data systems as a whole. In addition, how a data access request is routed also affects the performance. In some applications, data need to be stored in a persistent manner in data storages and be accessed reliably. There are applications that most of time read data from data storages and much less frequently write or update data stored in data storages. For this type of applications, the present teaching discloses architecture of data centers in a ring topology with a designated master server for write operation and connected slave servers.

Figure 1:
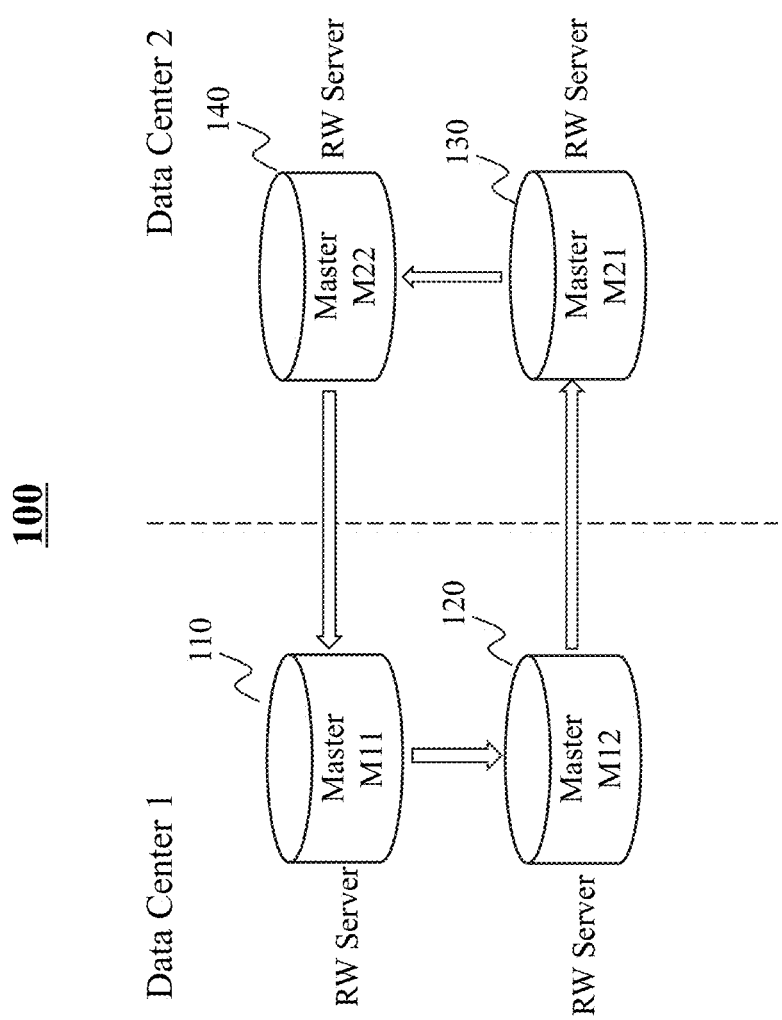
FIG. 1 (PRIOR ART) depicts an exemplary conventional framework for data access from data centers.
Figure 2:
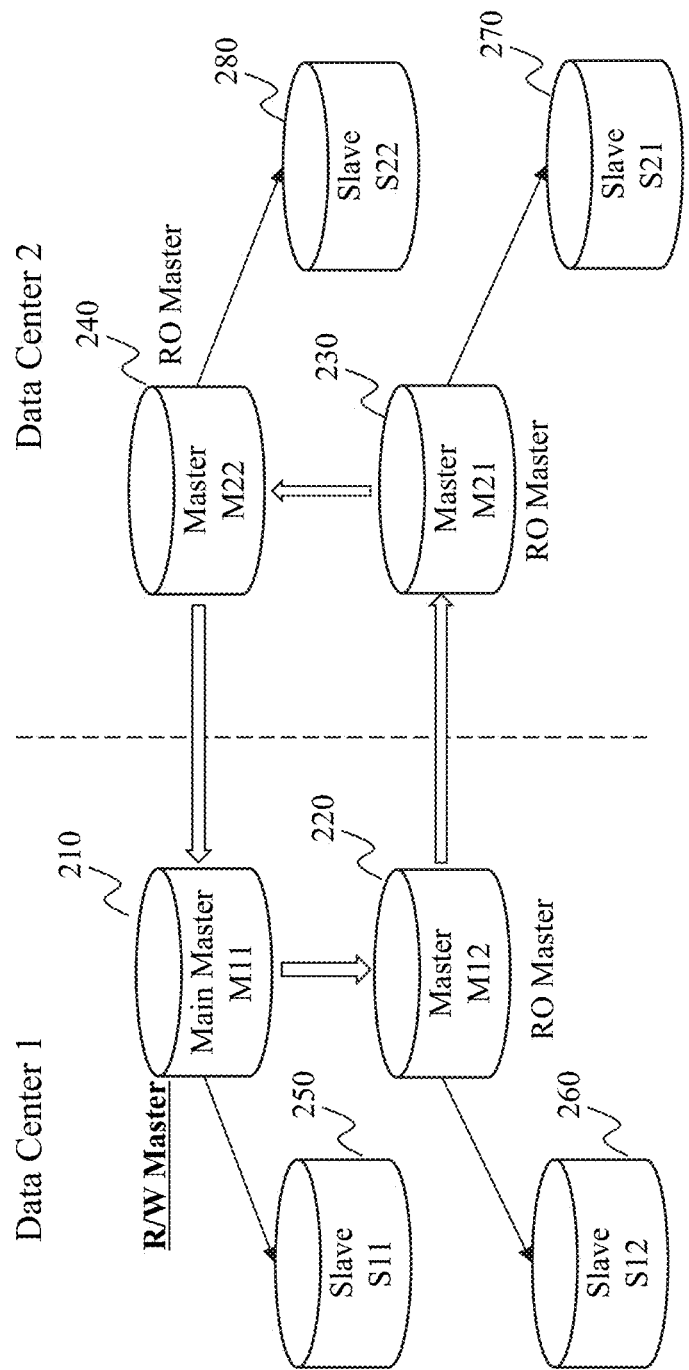
FIG. 2 depicts an exemplary data system with a plurality of data centers, according to an embodiment of the present teaching.

FIG. 2 depicts an exemplary data system 200 with data centers suitable for applications with mostly read operations, according to an embodiment of the present teaching. The exemplary data system 200 includes two data centers, data center 1 and data center 2. Each data center has two master servers, each of which is connected to its own slave servers, respectively. Specifically, data center 1 comprises a master M11 210 and a master M12 220, wherein master M11 210 is connected with its own slave S11 250 and master M12 is connected with its own slave S12 260. Data center 2 is similarly constructed, i.e., there are two master servers and each is connected with its own slave server, respectively. Master M22 in data center 2 is connected to its slave S22 280 and master M21 is connected to its own slave S21 270.

In the exemplary data system 200, the master servers (M11 210, M12 220, M21 230, and M22 240) are connected to form a ring topology. That is, master M11 210 is connected to M12 220 within data center 1. Master M12 220 in data center 1 is connected to master M21 230 in data center 2, which is connected to master M22 240 in the same data center. Master M22 240 is then connected back to master M11 in data center 1. Through such connections, data can be replicated from one master to other masters/slaves in the ring. For example, any data that are written to data center 1 by master M11 210 is replicated in master M12 220 and slave S11 250. Then master M12 220 replicates the same data in master M21 230 across the data center boundary and also in its slave S12 260. Further, data replicated in master M21 230 is replicated in master M22 240 as well the slave S21 270. Master M22 then also replicates the same data in its connected slave master M22.

When applications have much more reads than writes, according to the present teaching, only one master server in the ring is to be designated to perform both read and write. Other masters will be handling only read requests. In FIG. 2, master M11 210 is designated as a read and write master, or R/W master. Masters M12 220, M21 230, and M22 240 are designated as read masters or RO masters for read only operations. In some embodiments, although R/W master can also handle read requests, it is possible to direct a small portion or special type of read operation to the R/W master. For example, any read operation that requires consistency may be directed to the R/W master to handle read access. Such an arrangement ensures the consistency of data read because R/W master is the only place where writes can be performed and write and read cannot be operated at the same time by the R/W master. In this manner, any contention between read and write requests and/or inconsistency can be avoided. In operation, whenever any data is written into master M12 210 in the data system 200 by master M12 210 (R/W master), the written data is replicated in all other RO masters in the ring as well as in all slave servers connected to the R/W and RO masters. In this way, any data written into the data system 200 can be accessed from any master in the data system 200.

Figure 3:
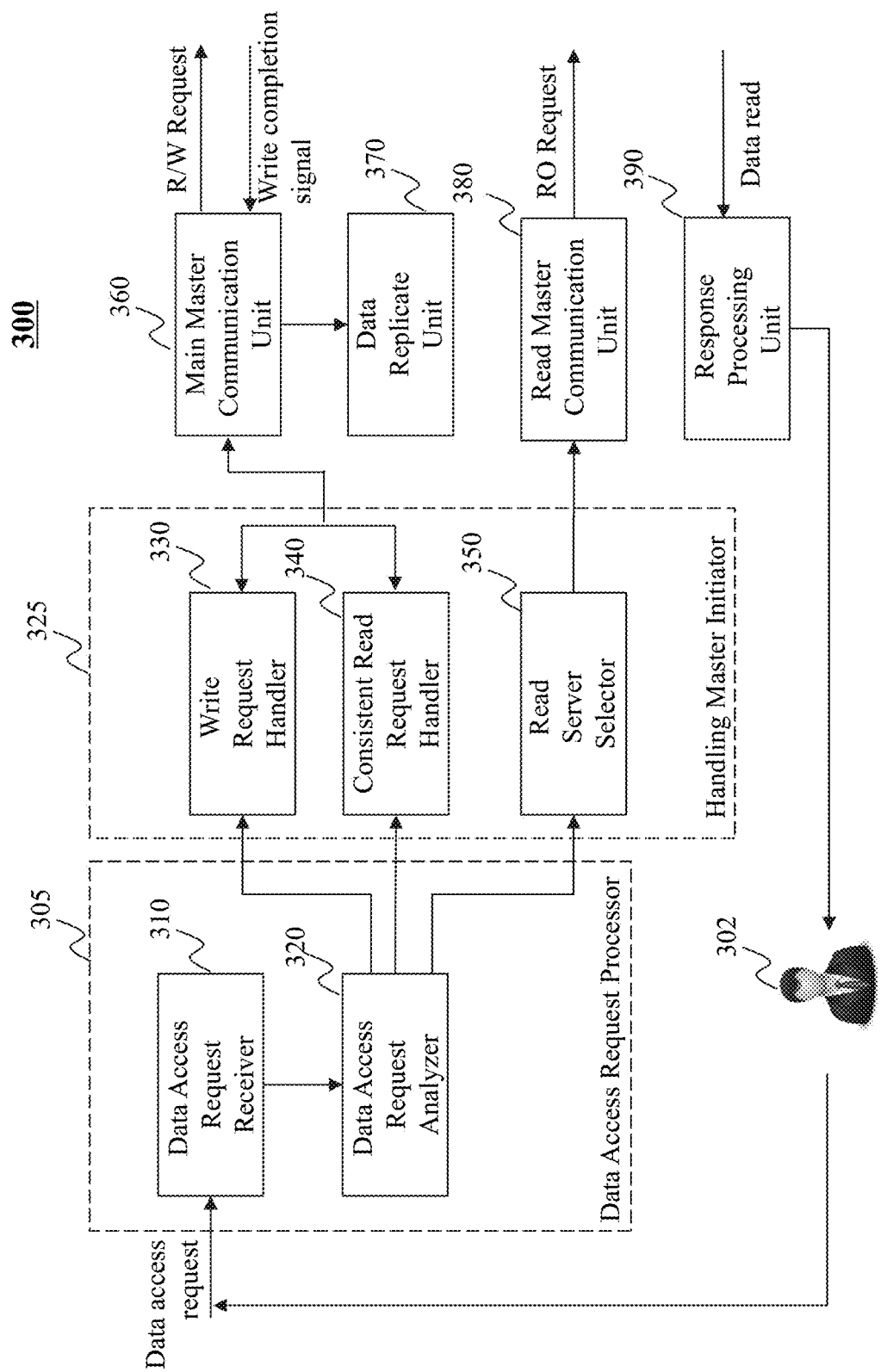
FIG. 3 depicts an exemplary high level system diagram for responding to a data access request in a data system, according to an embodiment of the present teaching.

FIG. 3 depicts an exemplary high level system diagram 300 for data access request control, according to an embodiment of the present teaching. The data access request control system 300 comprises a data access request processor 305, a handling master initiator 325, a main master communication unit 360, a data replicate unit 370, a read master communication unit 380, and a read data processing unit 390. The data access request processor 305 comprises a data access request receiver 310 and a data access request analyzer 320. The data access request receiver 310 interacts with a user 302 and receives a request to access data. Each received data access request is provided to the data access request analyzer 320 for an analysis of the request. This includes determining the type of data access request, e.g., read or write, or whether a read request corresponds to a read request with consistency.

Based on the nature of the data access request, the data access request analyzer 320 invokes the handling master initiator 325 to activates an appropriate sever to handle the request. The handling master initiator 325 is configured to invoke, based on a received data access request, an appropriate master to handle a received request. The handling master initiator 325 comprises a write request handler 330, a consistent read request handler 340, and a read server selector 350. In response to a write request, the write request handler 330, once invoked by the data access request analyzer 320, activates the main master communication unit 360 to send an R/W request to the R/W (or main) master M12 210 with data to be written. When a read request is recognized to be a consistent read request, the data access request analyzer 320 invokes the consistent read request handler 340. In some embodiments, as there is one master is designated to be a server to write data into the data system 200, when a read is required to be consistent, the read request may also be handled by the R/W master to ensure consistency. In this case, the consistent read request handler 340 invokes the main master communication unit 360 to activate the R/W master to perform the consistent read operation. As write and consistent read requests are performed by the same master server, the consistency is guaranteed.

The main master communication unit 360, once activated, may take the responsibility to communicate with the R/W master to perform the data access operation requested. For a write operation, the main master communication unit 360 may send an R/W request to the R/W master and pass on the information related to what is to be written and where the write is to occur and any other requirements associated with the operation. For a consistent read operation, the main master communication unit 360 may send a read request with information that identifies what is to be read. Once the operation request is sent, the main master communication unit 360 may then wait for a response from the R/W master indicating the status of the operation.

Upon receiving a write request from the main master communication unit 360, the R/W master M11 210 may write the data passed onto it into the database as requested and then, upon completion of the write, send a write completion signal to the main master communication unit 360. If the request is a consistent read request, the R/W master M11 210 may read the data to be requested and respond to the main master communication unit 360 with the data read from the database.

Upon receiving a response from the R/W master M11 210, the main master communication unit 360 may invoke the replicate unit 370 to determine whether replication is needed. If a write operation is requested and the corresponding response from the R/W master M11 210 indicates a successful write operation, the data replicate unit 370 may carry out the replication tasks to make sure that such newly written data is replicated in all servers in accordance with an order, e.g., the order from M11 210 to M12 220 and S11 250, from M12 220 to M21 230 and S12 260, from M21 230 to M22 240 and S21 270, and from M22 240 to S22 280. If the write operation is not successful, no replication is to be performed. If the requested operation is consistent read, as no data in the databases has been changed, no replication may be performed.

When the request is a consistency read, the R/W master, when successfully completing the requested read operation, may respond with the data read. The data read is received by the read data processing unit 390 and is processed before it is returned to the user 302 as a response to the data access request.

When a received data access request is a read request (without the requirement of consistency), the read server selector 350 may be invoked. As there are multiple RO master servers that can handle a read request, the read server selector 350 may identify one of the RO master servers in data system 200 to perform the requested read. As discussed herein, via data replication as described herein, each master has the same data that have been written and stored previously. Given that, any of the RO servers may accomplish the read request. As to which RO master is to perform the operation may depend on other considerations.

The read server selector 350 may perform the selection based on any set of criteria which may consider, e.g., the geographical location of each RO master server, the health and load of each RO master server, the quality of the network connection to each RO master server, etc. Once an RO master server is selected to handle the read request, the read server selector 350 may then invoke the read request handler 380 to activate the selected RO master server. When the data read operation is completed, the selected RO master server may then respond to the read request with, when successful, the data read from database. When the read data processing unit 390 receives the data read from the selected RO master server, it may then process the data read and return the data read to the user 302 as a response to the data access request.

Figure 4:
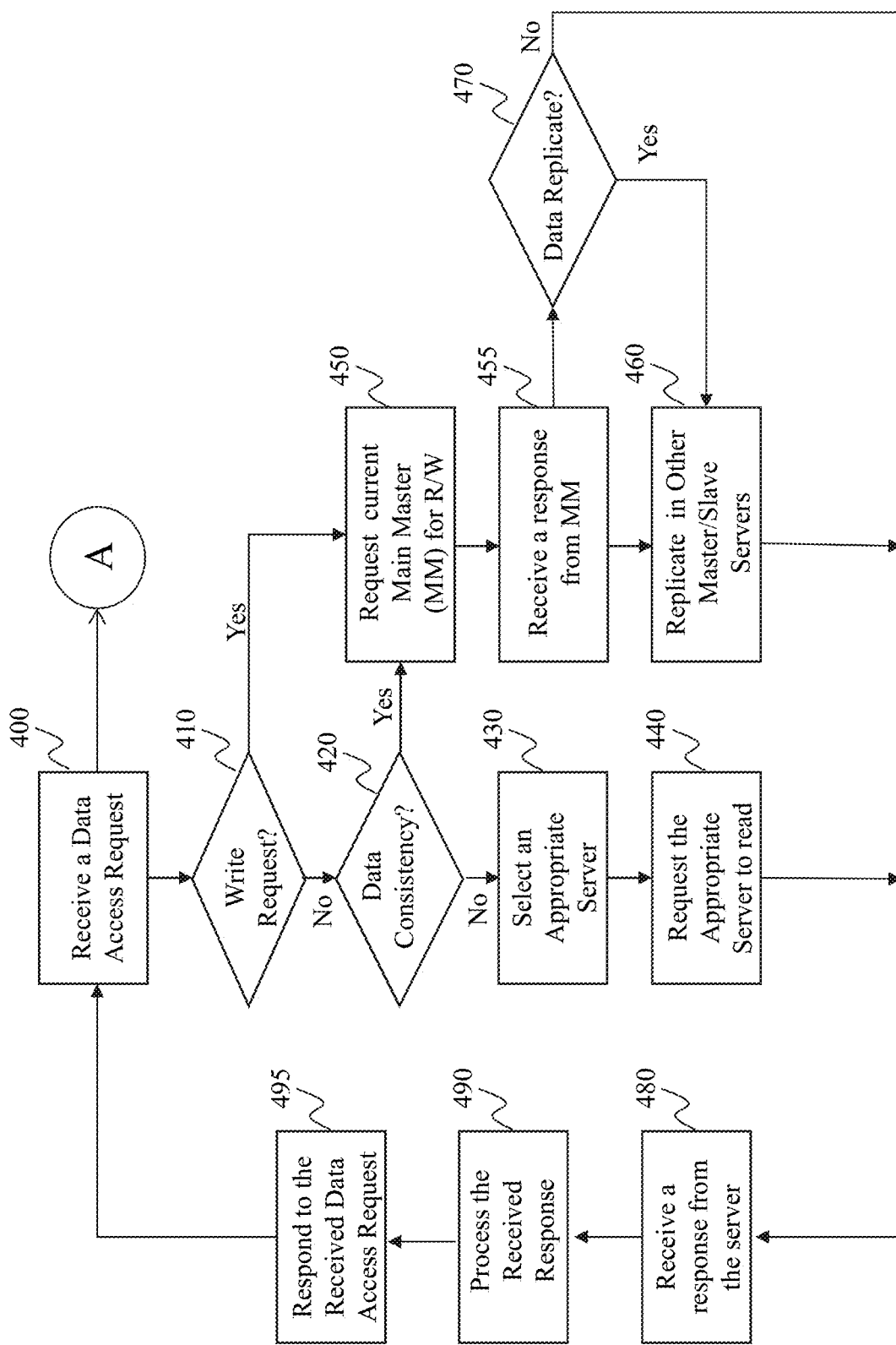
FIG. 4 is a flowchart of an exemplary process for responding to a data access request in a data system, according to an embodiment of the present teaching.

FIG. 4 is a flowchart of an exemplary process for processing a data access request in the data center system 200, according to an embodiment of the present teaching. A data access request is received first at 400. It is determined, at 410 and 420 respectively, whether the data access request is a write request or a consistent read request. If it is either a write or a consistent read request, the R/W master server is invoked, at 450, to perform the requested operation. If the data access request is neither a write nor a consistent read operation, a normal read operation is requested. In this case, an appropriate RO master server is selected at 430 and a request for the normal read is sent at 440 to the selected RO master. When a response is received, at 480, from the server that performs the requested data access, it is processed at 490 and the data center responds, at 495, to the user who sent the data access request, with data read by the selected master server. Then the process goes back to 400 to wait for the next data access request.

When the data access request is either a write or a consistent read operation, a request for the requested data access is sent, at 450, to the main master or R/W master. When a response is received, at 455, from the main master, it is determined, at 470, whether to replicate the data just written to M11 210. If it is a written request, the newly written data is to be replicated. In this case, the data replicate unit 370 is invoked to have the new data replicated according to the order as discussed herein. When the requested operation is a consistent read, no replication is needed. At 480, a response from the R/W master server (or main server MM) is received, which is then processed at 490. Based on the response from the R/W master server, a response to the user is sent at 495. Then the process goes back to 400 to wait for the next data access request.

Figure 5A:
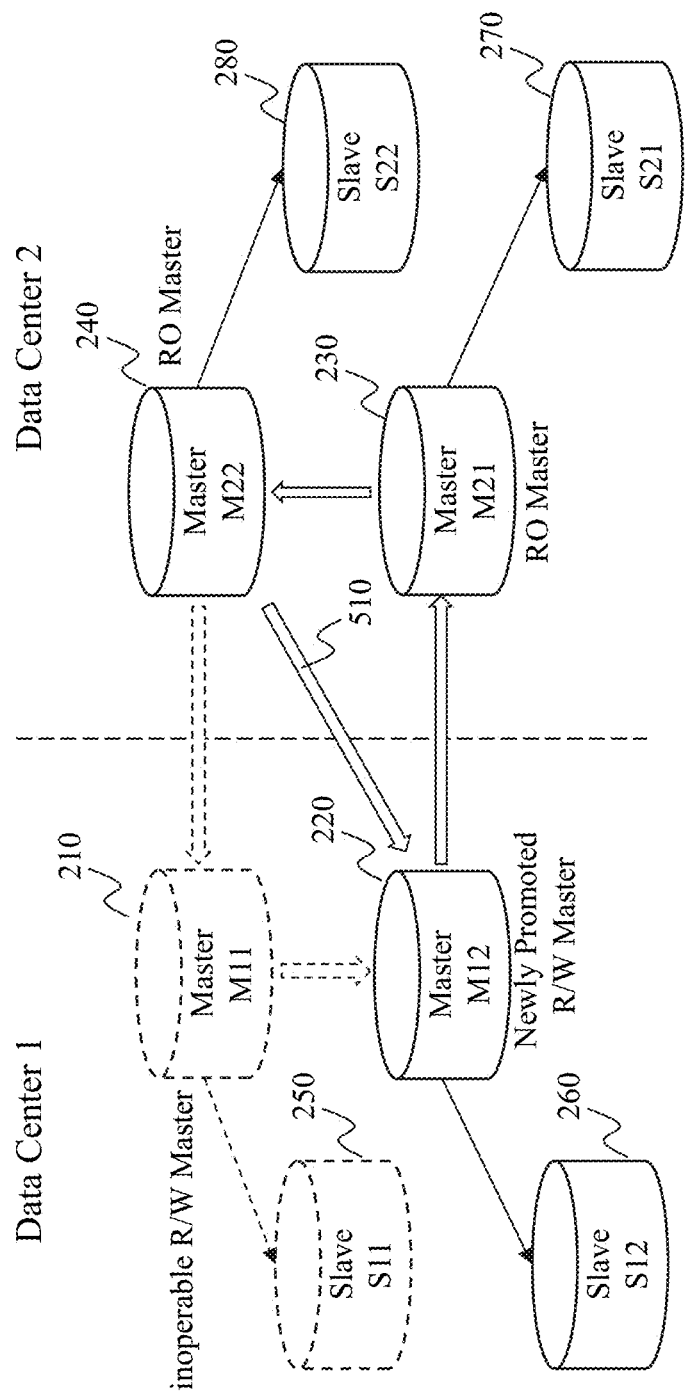
FIGS. 5A and 5B illustrate different exemplary fault tolerant structures in a data system, according to an embodiment of the present teaching.

FIG. 5A illustrates an exemplary fault tolerant structure when the R/W master server M11 210 in data center 1 fails in the data system 200, according to an embodiment of the present teaching. When the R/W master 210 fails, its slave S11 250 is also taken out of the operation. In FIG. 5A, the failed servers (whether master or slave) that failed as well as the connections thereto and therefrom are shown as dotted. To maintain the operation, a new R/W master is to be selected to replace the failed R/W master. In some embodiments, an RO master residing in the same data center and initially connected to the failed R/W master server is to be selected as the new R/W master. Thus, RO master M12 220 within the same data center is now made a newly promoted R/W master server. This is shown in FIG. 5A.

To maintain the ring architecture, a new link 510 is established that connects master M22 240 in data center 2 to the newly promoted R/W master server M12 220. Because any data that has been written into the now in-operable R/W master M11 210 has been replicated into the newly promoted R/W master M12 220, the newly promoted R/W master M12 220 has all the data needed to continue the operation as the new R/W master. In this fault tolerance mode, as the new R/W master is elected from the same data center, the necessary data migration required to get the new R/W master to start to operate does not need to be cross data centers so that it is much faster and efficient. With this newly established ring structure, the newly R/W master M12 220 will be invoked to handle all write and consistent read operations and remaining RO masters (M21 230 and M22 240) will continue to perform normal read operations. When the new R/W master M12 220 writes data, the newly written data is replicated in slave S12 260, the RO master M21 230, slave S21 270, RO master M22 240 and then slave S22 280, in that order. Although the replication will not be done at this stage with respect to M11 210 and S11 250, the replication in both may be performed when the failed R/W master M11 210 is recovered. This is disclosed in detail with respect to FIGS. 7-8.

Figure 5B:
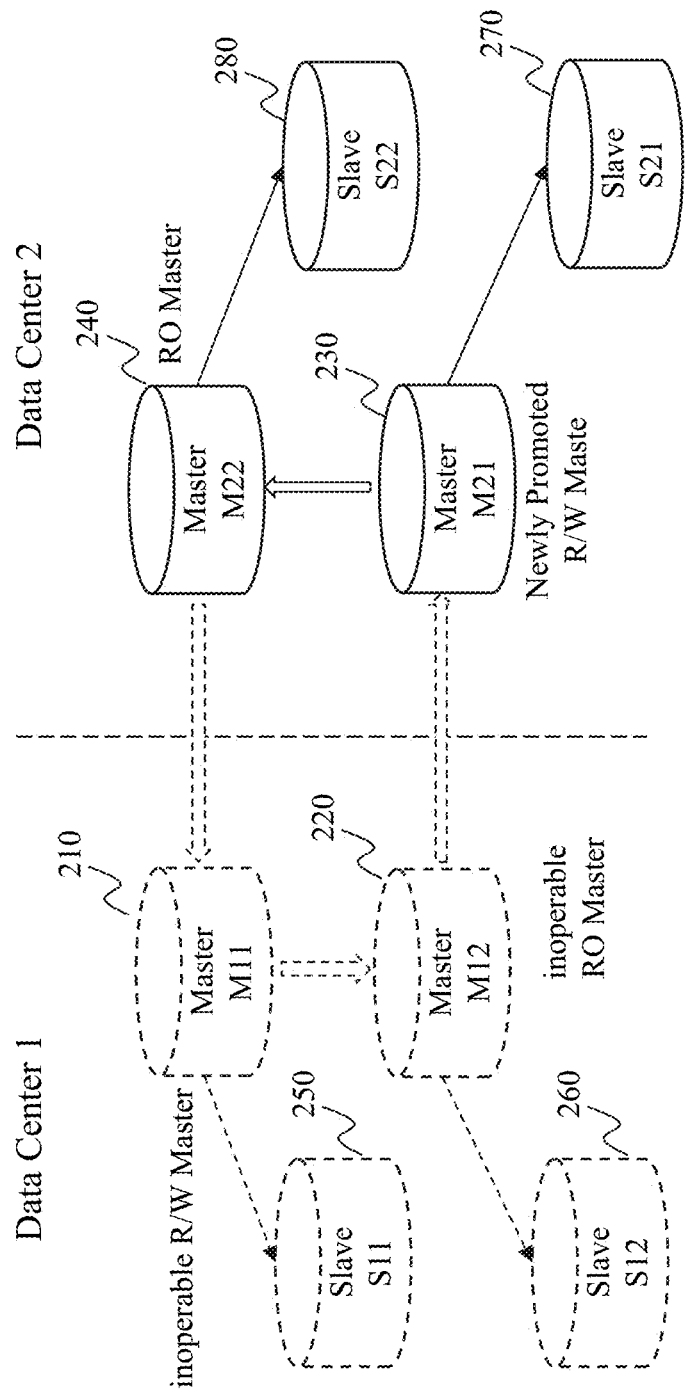

FIG. 5B illustrates a different exemplary fault tolerant structure when a data center fails, according to an embodiment of the present teaching. In this example, both master servers (M11 210 and M12 220) are not operable so that the new R/W master has to be selected from a different data center, e.g., data center 2. As shown, any server and link thereto or therefrom are dotted, including masters M11 210 and M12 220, slaves S11 250 and S12 260, as well as any links associated with those servers. In some embodiments, the closest RO master in data center 2 may be selected as the new R/W master. In FIG. 5B, the closest RO master to the failed data center 1 is RO master M21 230 and it is now selected as the newly promoted R/W master server.

Figure 6:
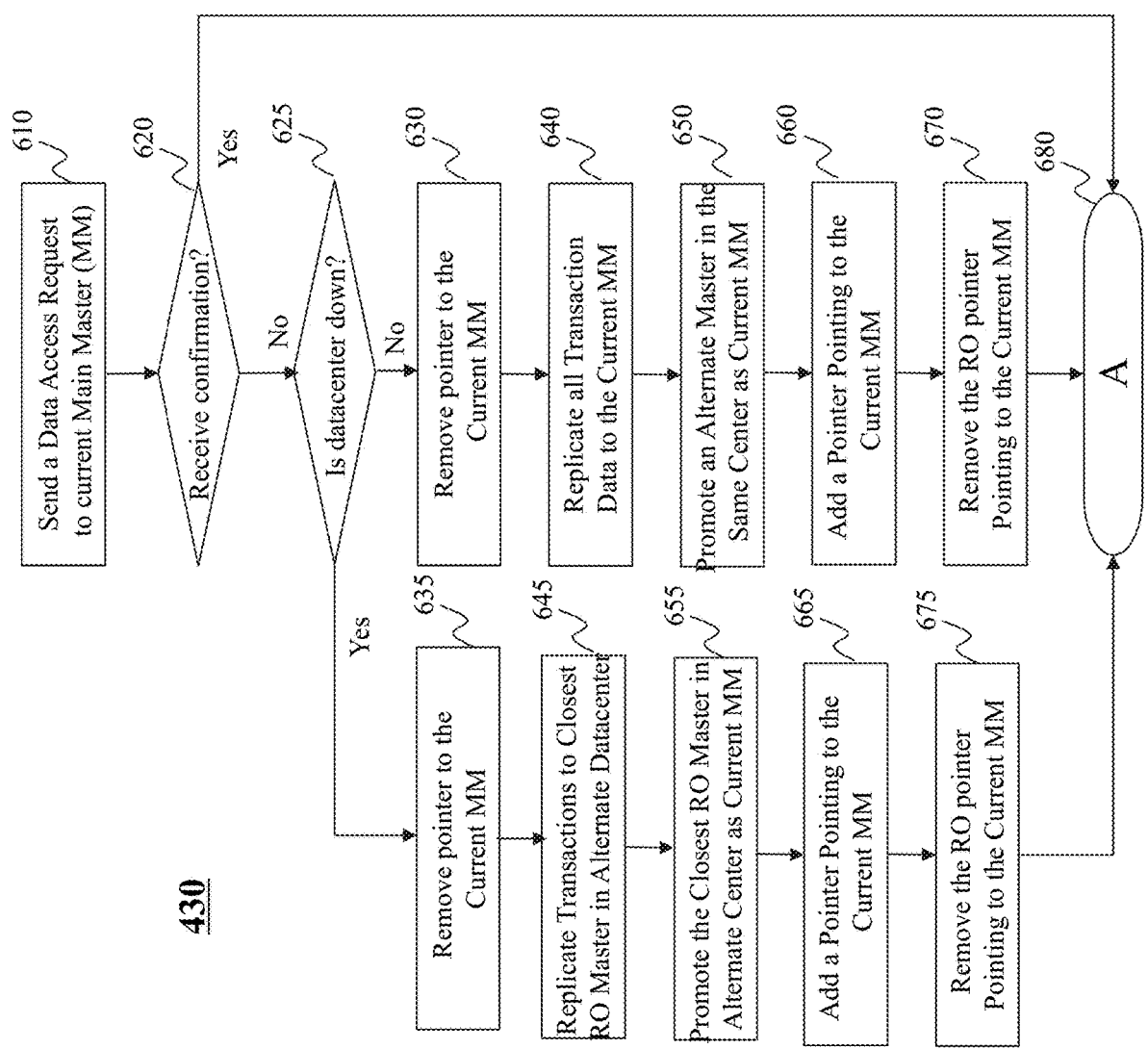
FIG. 6 is a flowchart of an exemplary process for fault tolerant operation in a data system, according to an embodiment of the present teaching.

FIG. 6 is a flowchart of an exemplary process for fault tolerant operation in data system 200, according to an embodiment of the present teaching. A data access request is sent, at 610, from, e.g., the main master communication unit 360 to the current main master or R/W master M11 210. If a confirmation is received from the current R/W master, determined at 620, there is no need to perform fault tolerant steps and the process proceed to 680, which is connected to A in FIG. 4 to process a data access request.

If no confirmation is received from the current R/W master, it indicates that something is not operable. Thus, it is further checked, at 625, whether the data center where the R/W master is located is inoperable. If the answer is no, it indicates that the current R/W master is not operable and an alternative R/W master may need to be selected from the same data center. If the answer is yes, it indicates that the entire data center where the current R/W master is located is not operable. In this case, an alternative R/W master may need to be selected from a different data center.

In the case of a failure of the current R/W master, the process proceeds to step 630, where the pointer linking to the current R/W master (M11 210) is removed. This removes the current R/W master from the operation so that this R/W master 210 is now no longer the current R/W master. Then a new current R/W master (M12 220) is selected from the same data center and all relevant transactions are replicated, at 640, in the new current R/W master. The new current R/W master (220) in the same data center is then promoted, at 650, as the current R/W master. To make the new current R/W master accessible as the current R/W master, a pointer is added, at 660, to point to the current R/W master 220 and an original pointer pointing at the current R/W master as an RO master is removed at 670. Now the data system 200 is re-configured to have a new current R/W master. The process then proceeds to 680, which is connected to point A in FIG. 4 to continue to process a data access request.

In the case of a failure of the data center where the current R/W master (M11 210) resides (data center 1), the process proceeds to step 635, where the pointer linking to the current R/W master (M11 210) is removed. This removes the current R/W master from the operation so that this R/W master 210 is now no longer the current R/W master. Then a new current R/W master is to be selected. As in this case, the entire data center 1 is down, a new current R/W master is to be selected from an alternative data center (data center 2). In some embodiments, a closest RO master (M21 230) in the alternative data center 2 is to be selected as the current R/W master. Transactions are replicated to the new current R/W master M21 230 at 645 and the M21 230 is then promoted at 655 as the current R/W master. To make the new current R/W master accessible as the current R/W master, a pointer is added, at 665, to point to the current R/W master M21 230 and an original pointer pointing at the current R/W master as an RO master is removed at 670. Now the data system 200 is re-configured to have a new current R/W master. The process then proceeds to 680, which is connected to point A in FIG. 4 to process a data access request.

Figure 7:
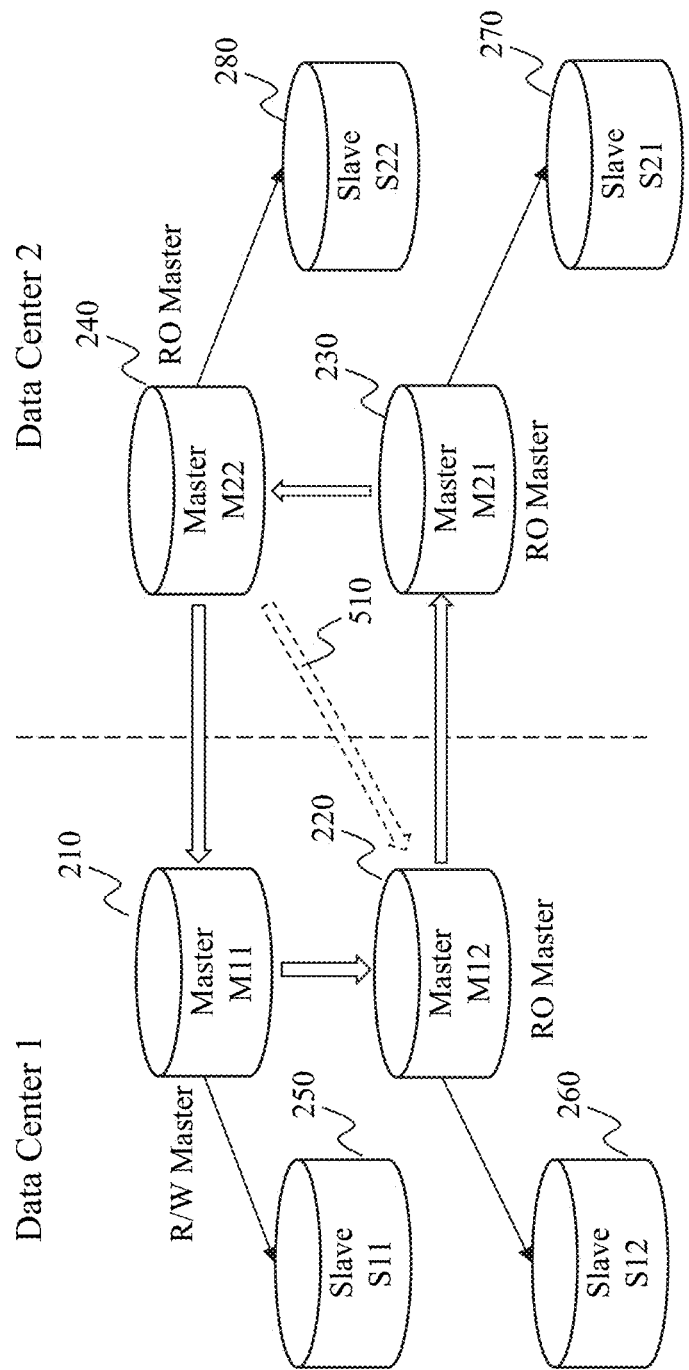
FIG. 7 illustrates another exemplary fault tolerant structure in a data system, according to an embodiment of the present teaching.

FIG. 7 illustrates an exemplary recovery scheme of fault tolerance in data system 200, according to an embodiment of the present teaching. This recovery corresponds to the failure of the R/W master M11 210 as depicted in FIG. 5A. When the master M11 210 recovers from a failure, the recovery process is to put M11 210 back as the R/W master and revive the connections associated with master M11 210. Specifically, master M12 220 is now put back as an RO master. The connections from M11 210 to M12 220 and S11 250 are also now made operational (solid). As such, the previously added link 510 (see FIG. 5A) is now also removed because it is no longer needed.

Figure 8:
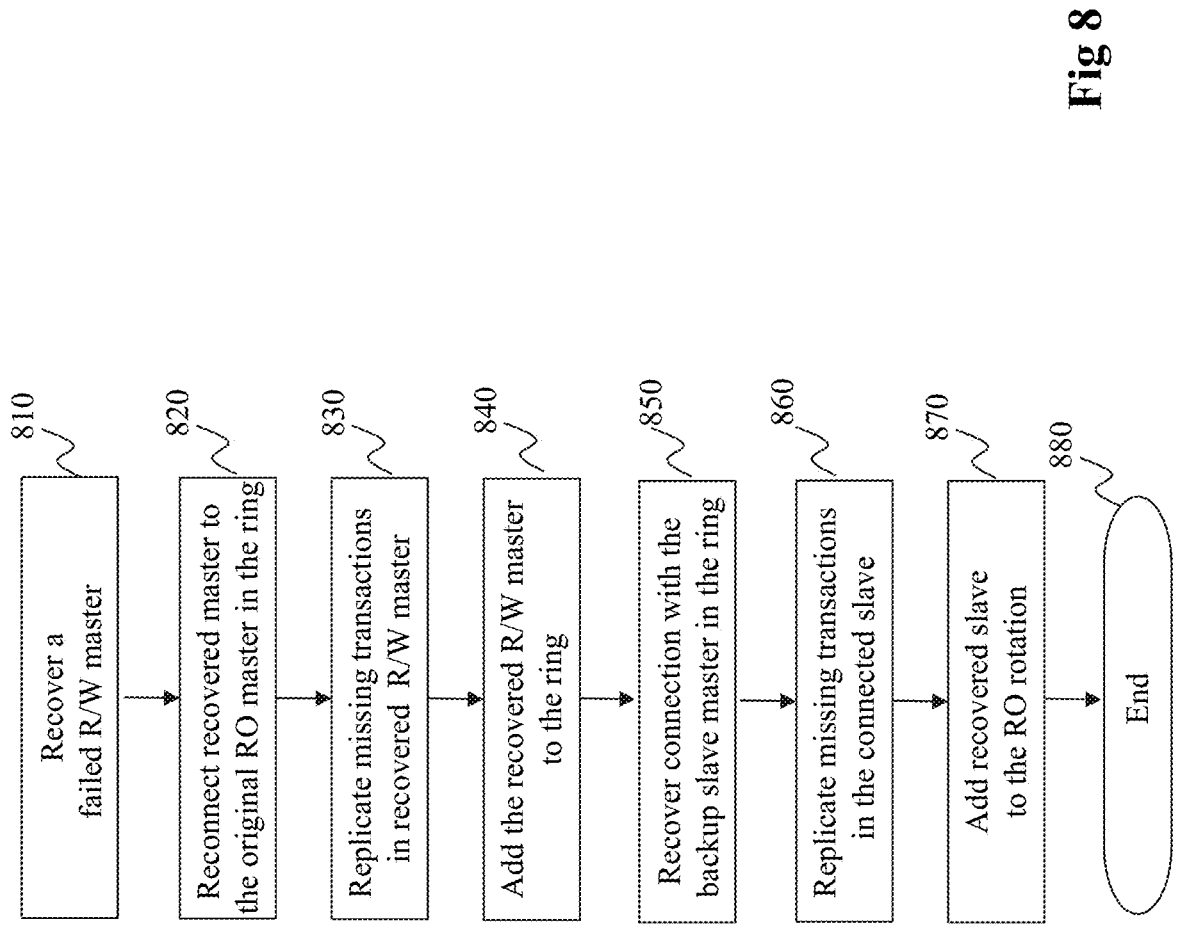
FIG. 8 is a flowchart of another exemplary process for fault tolerant operation in a data system, according to an embodiment of the present teaching.

FIG. 8 is a flowchart of an exemplary process for recovery from a previous failure of an R/W master in a data center as depicted in FIG. 7, according to an embodiment of the present teaching. The failed R/W master (M11 210) is first recovered at 810. Upon the recovery of the failed R/W master (M11 210), the recovered master is reconnected, at 820, to the RO master (M12 220) that was originally connected to the failed R/W master in the ring. The transactions that have been missing in the failed R/W master (transactions performed when the failed R/W master is out of operation) are replicated, at 830, in the recovered R/W master (M11 210). Upon completion of the replication, the recovered R/W master is added, at 840, to the ring. The connection from the recovered R/W master (M11 210) and its slave (backup) server (S11 250) is then recovered at 850. Through the recovered connection, the missing transactions that have just been replicated in the recovered R/W master (M11 210) are now replicated, at 860, in the newly re-connected slave server (S11 250) so that the recovered slave server can now be added, at 870, to the operation loop.

Figure 9:
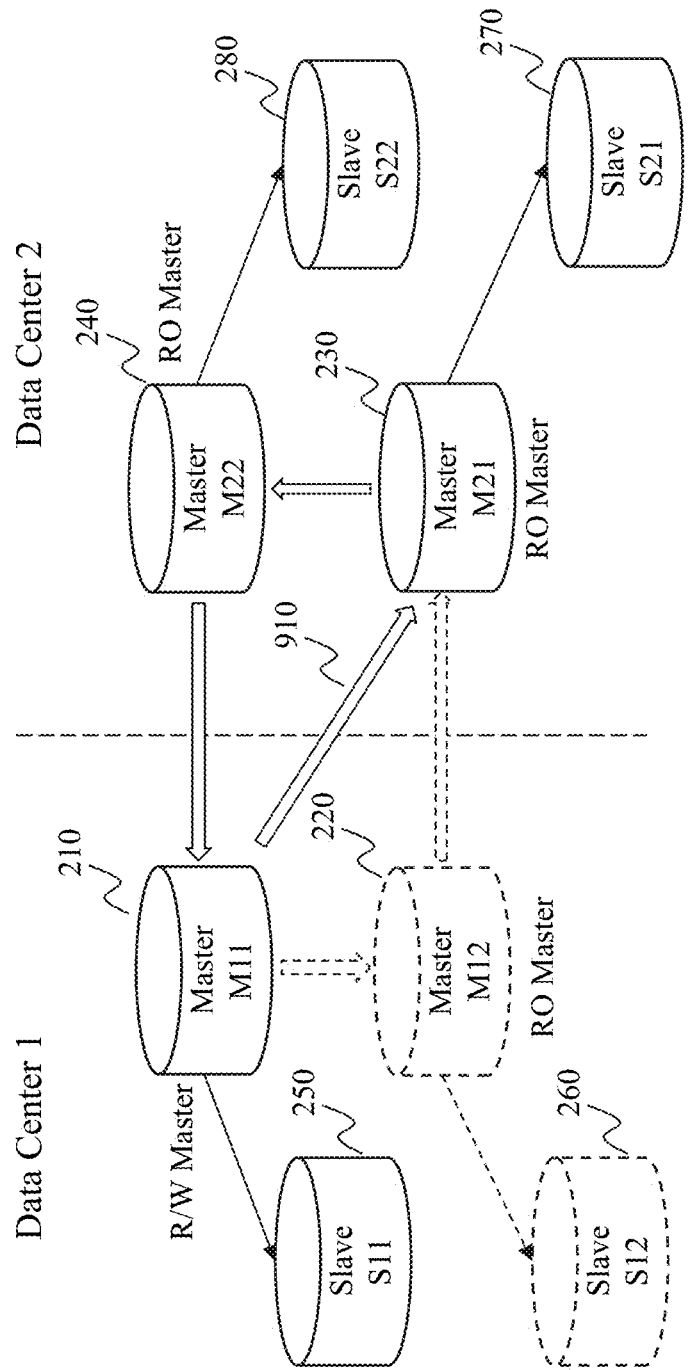
FIG. 9 illustrates another different exemplary fault tolerant structure in a data system, according to an embodiment of the present teaching.

FIG. 9 illustrates a different exemplary fault tolerant scenario in data system 200, according to an embodiment of the present teaching. In this exemplary situation, what is failing is the RO master (M12 220) connected to an R/W master (M11 210). When this occurs, the slave server connected to the failed RO master (M12 220) is also out of commission. In effect, the connections to/from the failed RO master are also not effective. This is shown in FIG. 9, where M12 220, S12 260, the connection from the R/W master M11, and the connection to RO master M21 are all marked as dotted. With M12 220 fails, the connection between data center 1 and data center 2 is broken.

To maintain the ring structure and the connection between the two data centers, the present teaching discloses to add a connection 910 between the R/W master M11 210 in data center 1 and the RO master M21 230 in data center 2 so that the ring architecture is maintained. With the newly configured ring architecture, when the R/W master M11 210 writes data, the data written may be replicated now to its slave S11 250 as well as RO master M21 230, slave S21 270, RO master M22 240, and slave S22 280 in data center 2.

Figure 10:
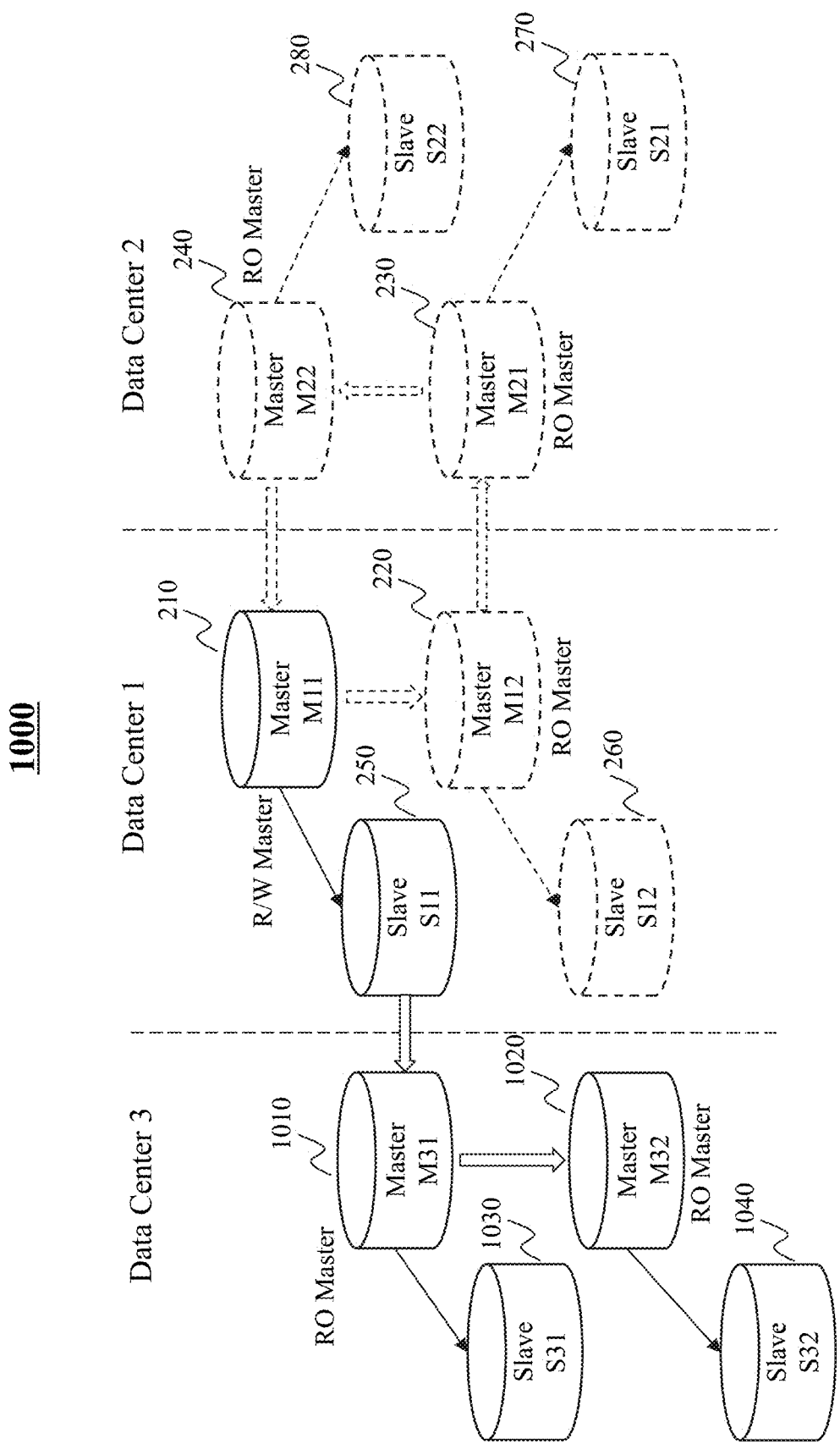
FIG. 10 illustrates yet another different exemplary fault tolerant structure in a data system, according to an embodiment of the present teaching.

FIG. 10 illustrates yet another different exemplary fault tolerant structure in a data system 1000 with more than two data centers, according to an embodiment of the present teaching. In this exemplary situation, what is failing is also RO master (M12 220) connected. As discussed herein, when this occurs, the connections between data center 1 and data center 2 is interrupted. FIG. 9 provides a solution by introducing a new link 910 to re-establish the connection between the two data centers. FIG. 10 provides an alternative solution. In FIG. 10, when RO master M12 220 fails, its connection to data center 2 is broken so that none of the servers in data center 2 is accessible, as discussed previously. Instead of re-establishing the connection to data center 2, the exemplary embodiment in FIG. 10 utilizes the connection with another data center 3 to provide fault tolerance. In this architecture, data center 3 comprises an RO master M31 1010 which is connected to its own slave S31 1030 as well as another RO master M32 1020 connected with its own slave S32 1040.

With this architecture, in normal operations, whenever the R/W master M11 210 write data, the new data is replicated not only to the servers in data center 2 (as disclosed herein) but also to the servers in data center 3. Specifically, when slave S11 250 is replicated with the newly written data, it replicates the same to RO master M31 1010 in data center 3, which then replicates the same data to RO master M32 1020 and its own slave S31 1030. Then RO master M32 1020 replicates the same data to slave S32 1040. Thus, data center 3 possesses the same data as data center 1 and data center 2.

When RO master M12 220 fails, the connection to data center 2 also fails but the connection to data center 3 remains intact. All write and consistent read requests may still be routed to the R/W master M11 210 to handle. All normal read requests can be routed to either RO master M31 1010 or RO master M32 1020 to handle. In this manner, the data system 1000 provides fault tolerance performance.

Figure 11:
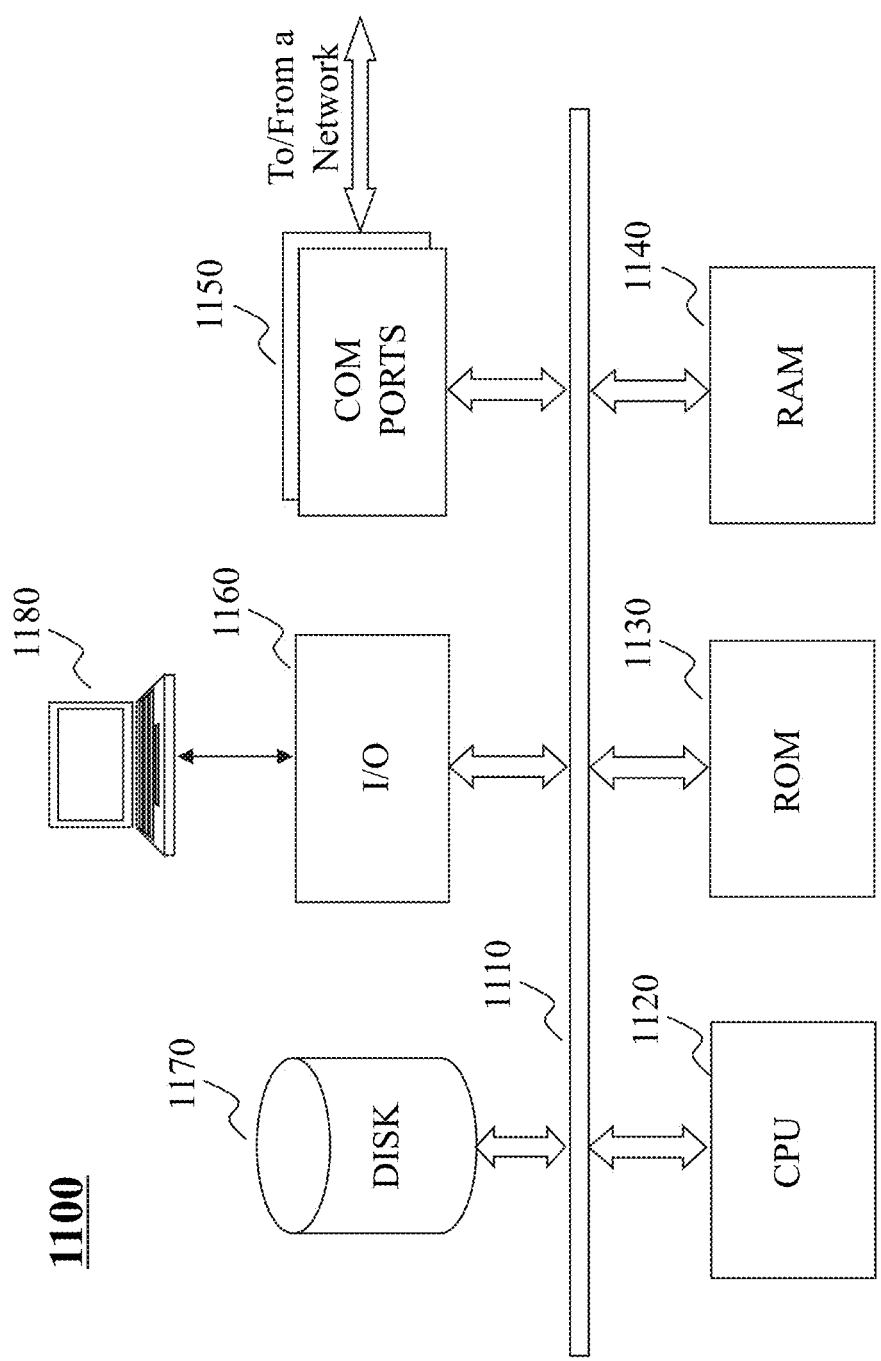
FIG. 11 depicts the architecture of a computer which can be used to implement a specialized system incorporating the present teaching.

FIG. 11 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1100 may be used to implement any component of the present teachings, as described herein. Although only one such computer is shown, for convenience, the computer functions relating to the present teachings as described herein may be implemented in a distributed fashion on a number of similar platforms, to distribute the processing load.

The computer 1100, for example, includes COM ports 1150 connected to and from a network connected thereto to facilitate data communications. The computer 1100 also includes a central processing unit (CPU) 1120, in the form of one or more processors, for executing program instructions. The exemplary computer platform includes an internal communication bus 1110, program storage and data storage of different forms, e.g., disk 1170, read only memory (ROM) 1130, or random access memory (RAM) 1140, for various data files to be processed and/or communicated by the computer, as well as possibly program instructions to be executed by the CPU. The computer 1100 also includes an I/O component 1160, supporting input/output flows between the computer and other components therein such as user interface element. The computer 1100 may also receive programming and data via network communications.

Hence, aspects of the methods of the present teachings, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other enhanced ad server into the hardware platform(s) of a computing environment or other system implementing a computing environment or similar functionalities in connection with the present teachings. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the present teachings as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a computer having at least one processor, a storage, and a communication platform for a data system, comprising:
   receiving a data access request to access data in the data system, wherein the data system comprises a designated read-write server for consistent read and write operations and a plurality of read servers, and wherein the designated read-write server and the plurality of read servers are connected in a ring topology;
   determining a type of the data access request;
   in response to the type being a first type of read request, invoking one of the plurality of read servers to process the request;
   in response to the type being a second type of read request or a write request, invoking the designated read-write server to process the request;
   receiving a response from a server invoked to process the request; and
   responding to the data access request based on the received response.

2. The method of claim 1, wherein each of the read-write server and the plurality of read servers is directly connected to a corresponding slave server.

3. The method of claim 1, wherein the first type of read request corresponds to a normal read request.

4. The method of claim 1, wherein the second type of read request corresponds to a consistent read request.

5. The method of claim 1, wherein the data system includes a plurality of data centers, wherein each of the plurality of data centers includes multiple servers, each of which is connected to a corresponding slave server, and the read-write server and the plurality of read servers in the plurality of data centers are connected to form the ring topology.

6. The method of claim 5, wherein the data system including the plurality of data centers comprises two data centers with servers in the two data centers connected in an order to form the ring topology, from the read-write server to a first read server in a first data center, from the first read server to a second read server in a second data center, and from the second read server to a third read server in the second data center.

7. The method of claim 6, further comprising:
   forming, when the read/write master fails, a modified ring structure by promoting the first read server in the first data center as a current read/write server and establishing a new connection between the second read server in the second data center to the current read/write server; and
   recovering, when the read/write server recovers, the ring structure by replicating, in the read/write server and a first slave server, transactions occurred when the read/write server is in a fail state, re-connecting the read/write server with the first read server in the first data center as well as the first slave server, and removing the new connection between the second read server in the second data center and the first read server in the first data center.

8. The method of claim 1, wherein one of the plurality of read servers is capable of being assigned as the new designated read-write server in response to detecting a failure in the designated read-write server.

9. The method of claim 1, wherein the first type of read request is different than the second type of read request.

10. A machine readable non-transitory medium having information recorded thereon for a data system, where when the information is read by the machine, the information causes the machine to perform:
    receiving a data access request to access data in the data system, wherein the data system comprises a designated read-write server for consistent read and write operations and a plurality of read servers, and wherein the designated read-write server and the plurality of read servers are connected in a ring topology;
    determining a type of the data access request;
    in response to the type being a first type of read request, invoking one of the plurality of read servers to process the request;
    in response to the type being a second type of read request or a write request, invoking the designated read-write server to process the request;
    receiving a response from a server invoked to process the request; and
    responding to the data access request based on the received response.

11. The medium of claim 10, wherein each of the read-write server and the plurality of read servers is directly connected to a corresponding slave server.

12. The medium of claim 10, wherein the first type of read request corresponds to a normal read request.

13. The medium of claim 10, wherein the second type of read request corresponds to a consistent read request.

14. The medium of claim 10, wherein the data system includes a plurality of data centers, wherein each of the plurality of data centers includes multiple servers, each of which is connected to a corresponding slave server, and the read-write server and the plurality of read servers in the plurality of data centers are connected to form the ring topology.

15. The medium of claim 14, wherein the data system including the plurality of data centers comprises two data centers with servers in the two data centers connected in an order to form the ring topology, from the read-write server to a first read server in a first data center, from the first read server to a second read server in a second data center, and from the second read server to a third read server in the second data center.

16. A data system, comprising:
   a designated read-write server for consistent read and write operations and a plurality of read servers, wherein the designated read-write server and the plurality of read servers are connected in a ring topology;
   a data access request receiver implemented by a processor and configured for
      receiving a data access request, and
      determining a type of the data access request;
   a read master communication unit implemented by the processor and configured for invoking one of the plurality of read servers to process the request in response to the type being a first type of read request;
   a main master communication unit implemented by the processor and configured for invoking the read-write server to process the request in response to the type being a second type of read request; and
   a response processing unit implemented by the processor and configured for
      receiving a response from a server invoked to process the request, and
      responding to the data access request based on the received response.

17. The system of claim 16, wherein each of the read-write server and the plurality of read servers is directly connected to a corresponding slave server.

18. The system of claim 16, wherein the first type of read request corresponds to a normal read request.

19. The system of claim 16, wherein the second type of read request corresponds to one of a write request and a consistent read request.

20. The system of claim 16, wherein the data system includes a plurality of data centers, wherein each of the plurality of data centers includes multiple servers, each of which is connected to a corresponding slave server, and the read-write server and the plurality of read servers in the plurality of data centers are connected to form the ring topology.

21. The system of claim 20, wherein the data system including the plurality of data centers comprises two data centers with servers in the two data centers connected in an order to form the ring topology, from the read-write server to a first read server in a first data center, from the first read server to a second read server in a second data center, and from the second read server to a third read server in the second data center.

* * * * *